United States Patent [19]

Harpster

[11] 4,316,531
[45] Feb. 23, 1982

[54] CLUTCH LOCKOUT LATCH

[76] Inventor: Anthony B. Harpster, 16577 State Rd., North Royalton, Ohio 44133

[21] Appl. No.: 715,548

[22] Filed: Aug. 18, 1976

[51] Int. Cl.³ .................................................. F16D 23/12
[52] U.S. Cl. ........................... 192/114 R; 74/489; 74/535
[58] Field of Search ............... 192/114 R; 74/535, 489

[56] References Cited

U.S. PATENT DOCUMENTS

| | | | |
|---|---|---|---|
| 2,149,262 | 3/1939 | Ahler | 192/114 UX |
| 3,335,621 | 8/1967 | Buchwald | 74/535 X |
| 3,720,111 | 3/1973 | Guyton | 74/489 |
| 3,733,922 | 5/1973 | Tripp | 74/489 X |
| 3,856,123 | 12/1974 | Kinsey | 74/489 X |
| 3,896,680 | 7/1975 | Shoemaker | 74/489 |

Primary Examiner—Alan Cohan
Attorney, Agent, or Firm—Henn and Cain

[57] ABSTRACT

A manually operated latch mounted on the handlebar of a motorcycle and engaging the clutch control lever for releasably holding the clutch in a locked-out position or in a partially disengaged position.

2 Claims, 7 Drawing Figures

CLUTCH LOCKOUT LATCH

This invention relates to a motor-vehicle clutch lockout mechanism and more particularly to a clutch lockout for a motorcycle handlebar control.

One of the important objects of the invention is to provide a clutch lockout control operable with the handlebar clutch control and manually releasable by the operator without removing the hand from the handlebar.

The use of motorcycles as emergency vehicles and other uses wherein the immediate operation thereof must be facilitated requires that the engine be allowed to idle while the vehicle is in gear. With the standard control arrangement this mode of operation is not possible. It is necessary to shift the transmission prior to releasing the clutch thus using unnecessary time and an element of inconvenience. The latch mechanism disclosed herein eliminates the above conditions while facilitating the speedy and safe operation of the vehicle.

Accordingly, it is a further object of my invention to provide a latch carried on the handlebar which releasably holds the clutch control lever in the clutch-out position to allow the engine to idle while the vehicle remains stationary.

A still further object of the invention is to provide a thumb-operated lever with a detent thereon engagable with a rack, said lever being shiftable with the clutch lever and being releasably held in position by the engagement of said detent with the rack.

Other objects and advantages more or less ancillary to the foregoing and the manner in which all the various objects are realized, will appear in the following description, which considered in connection with the accompanying drawings, set forth the preferred embodiment of the invention.

Figure 1:
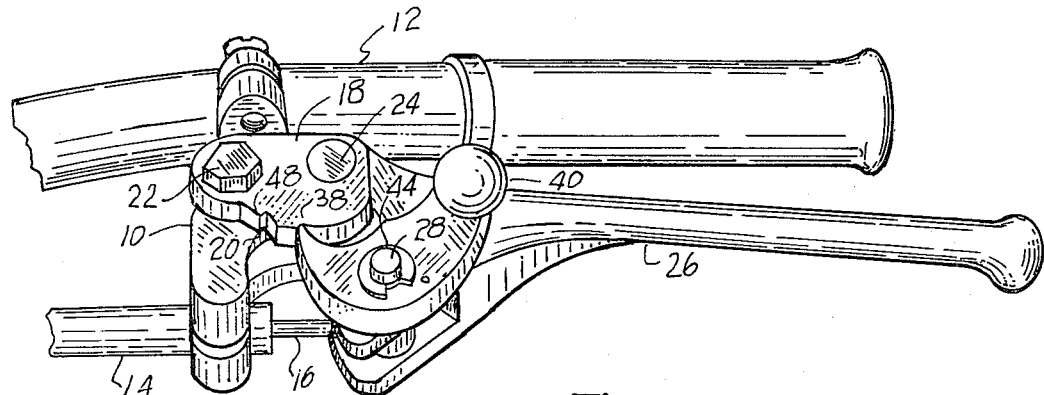
FIG. 1 is a perspective view showing the lach assembly with the clutch lever held in the clutch released position.
Figure 2:
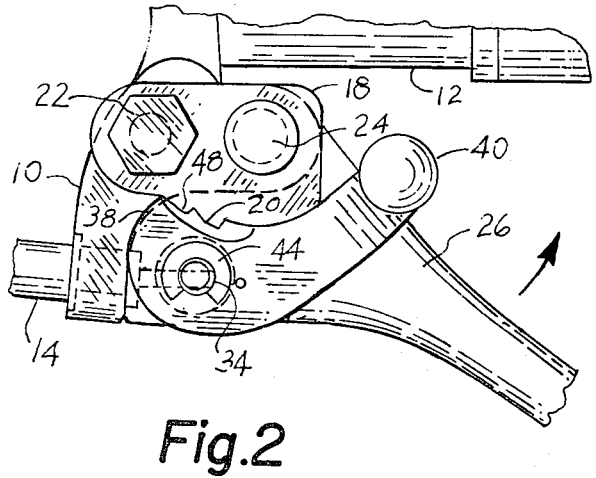
FIG. 2 is a top plan view showing the latch mechanism in the clutch lever released position.
Figure 4:
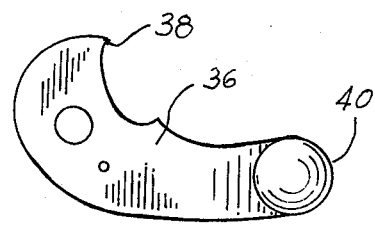
FIG. 4 is a detail view of the thumb lever and detent.
Figure 3:
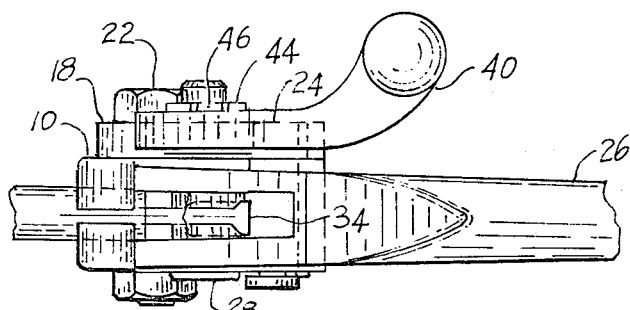
FIG. 3 is an elevational view showing the latch assembly incorporated with the standard clutch lever assembly.
Figure 5:
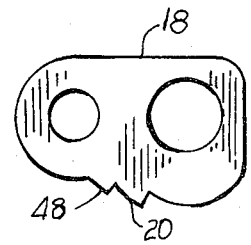
FIG. 5 is a detail view of the rack piece.
Figure 6:
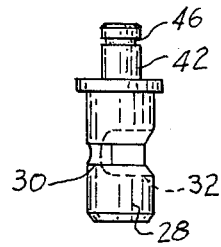
FIG. 6 is a side view of the pivot pin.
Figure 7:
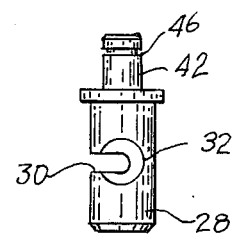
FIG. 7 is a detail view of the pivot pin shown in FIG. 6.

Referring first to FIG. 1 wherein is shown the clutch lock-out assembly, a body 10 is clamped rigidly to handlebar 12 usually found on a motorcycle as a steering and control element. A clutch control cable 14 is mounted in said body 10 and has a sliding wire 16 projecting therefrom.

A rack 18 having teeth 20 formed therein is bolted to said body 10 by cap screw 22 and also held in position by pivot pin 24. Pivot pin 24 carries for rotation around the axis thereof a clutch control lever 26 which is squeezed toward the handlebar 12 to release the clutch. The lever 26 carries a pin 28 pivotally mounted therein and spaced from pin 24. Pin 28 is provided with a slot 30 for receiving wire 16 and a circular recess 32 axially congruent with slot 30 receives an enlarged end 34 formed at the terminus of wire 16 and holds the wire 16 against pulling through the slot 30.

A detent lever 36 having a detent tooth 38 is provided with a thumb engagement section 40 for actuation by the operator of the vehicle. Lever 36 is rotatably mounted on the reduced portion 42 of pin 28 and removal therefrom is prevented by a snap ring 44 in engagement with groove 46 formed in the upper end of pin 28.

In operation, the clutch lever 26 is actuated toward the handlebar 20 to release the clutch and said clutch will remain released until the clutch lever 26 is allowed to travel away from the handlebar 20. In order to hold the clutch in the released condition while the rider is away from the vehicle a means is provided to hold the clutch lever 26 in the clutch disengaged position.

When the clutch has been disengaged the detent tooth 38 is placed in engagement with tooth 20 on the rack 18. The lever 26 will remain in this position until the lever 36 is actuated to release lever 26. It is noted that a second tooth 48 is provided on the rack which is a slipping clutch condition which allows for slow operation of the vehicle in parades, processions, or the like.

The operation of the device as above described will allow the machine to be idled while it is in gear and to be immediately ready for motion by the simple action of releasing the clutch.

Having thus described this invention in such full, clear and concise and exact terms as to enable any person skilled in the art to which it pertains to make and use the same, and having set forth the best mode contemplated of carrying out this invention, I state that the subject which I regard as being my invention is particularly pointed out and distinctly claimed in what is claimed, it being understood that equivalents or modifications of, substitutions for, part of the above specifically described embodiments of the invention may be made without departing from the scope of the invention as set forth in what is claimed.

What is claimed is:

1. A clutch control latchable in selected degrees of clutch engagement and mounted on a motorcycle handle bar having a handgrip, said clutch control being operably connected to the motorcycle clutch and independent of said handgrip, said latchable control comprising a body clamped to said handle bar adjacent said handgrip, an arcuate rack rigidly affixed to said body, a clutch control lever pivoted in said body and operably connected to the motorcycle clutch, and a detent pivotally mounted on said lever, said detent having a tongue engagable with said arcuate rack and having an arm with a rounded end opposite to said tongue, said rounded end being adjacent the end of the handgrip proximate to the control lever pivot, said detent being engagable with said rack for releasably holding said clutch lever at one end of its path of travel.

2. The clutch control of claim 1 wherein the rack has multiple teeth engagable by the tongue on said detent for holding said clutch in selected degrees of clutch engagement.

* * * * *